United States Patent [19]
Morita et al.

[11] Patent Number: 5,084,765
[45] Date of Patent: Jan. 28, 1992

[54] ASPECT RATIO-IMPROVED TELEVISION SYSTEM COMPATIBLE WITH CONVENTIONAL SYSTEMS

[75] Inventors: Takaya Morita; Akihiro Takahashi; Masao Inaba; Hidekado Nishihara, all of Tokyo, Japan

[73] Assignees: Tokyo Broadcasting System Inc.; NEC Corp., both of Tokyo, Japan

[21] Appl. No.: 416,102

[22] Filed: Oct. 2, 1989

[30] Foreign Application Priority Data

Sep. 30, 1988 [JP] Japan .................. 1-248059

[51] Int. Cl.$^5$ .................................... H04N 7/04
[52] U.S. Cl. ........................... 358/141; 358/180
[58] Field of Search ............... 358/142, 141, 140, 146, 358/83

[56] References Cited

U.S. PATENT DOCUMENTS

| | | | |
|---|---|---|---|
| 4,551,754 | 11/1985 | Meise et al. | 358/20 X |
| 4,556,906 | 12/1985 | Dischert et al. | 358/180 |
| 4,748,496 | 5/1988 | Drury et al. | 358/12 |
| 4,864,405 | 9/1989 | Chambers | 358/180 |

FOREIGN PATENT DOCUMENTS 1200881 8/1989 Japan .

OTHER PUBLICATIONS

"6-MHz Single-Channel HDTV Systems"; Schreiber at MIT; Ottawa HDTV Symposium; Oct. '87; pp. 1-7.

Primary Examiner—Victor R. Kostak
Attorney, Agent, or Firm—Ostrolenk, Faber, Gerb & Soffen

[57] ABSTRACT

In a wide-aspect television system, apparatus is provided for producing a source television signal for a wide aspect television screen, which source signal has the same horizontal and vertical synchronizing frequencies, but fewer effective scanning lines than a conventional television system. The wideaspect television system further includes apparatus for expanding the time base of the mentioned source television signal in the horizontal direction by a predetermined ratio. Further included is an apparatus for receiving a time base-expanded television signal produced by the expanding apparatus for arranging video information of both side areas of a time base-expanded television signal into top and bottom added scanning lines. A remaining area of the time base-expanded television signal substracted by both mentioned side areas have a horizontal scanning period substantially equal to a horizontal scanning period of the conventional television system. The total effective scanning lines of the source television signal and the top and bottom added scanning lines substantially corresponds to the total effective scanning lines of the conventional television system.

8 Claims, 10 Drawing Sheets

FIG.11a (INPUT)

FIG.11b (OUTPUT)

ASPECT RATIO-IMPROVED TELEVISION SYSTEM COMPATIBLE WITH CONVENTIONAL SYSTEMS

BACKGROUND OF THE INVENTION

The present invention relates to an aspect ratio-improved television system compatible with conventional television systems.

In recent years, the development of an improved television system having a wide aspect screen has been expected. In particular, an aspect ratio improved television system compatible with conventional systems (the NTSC system, for example) has been required. In an aspect ratio-improved television system compatible with a conventional system, a conventional television receiver can receive-and-produce a television picture of an aspect ratio of 3:4, and an improved television receiver can receive-and-produce a television picture of wide aspect ratio, for example, a ratio of 9:16.

At present, many aspect ratio-improved television systems have been proposed. However, according to the proposed systems, the amount of video information is increased by expanding the aspect ratio and, thus, it is necessary to multiplex the increased video information into the current broadcast band of 6 MHz. Accordingly, the quality of picture tends to be deteriorate and conventional broadcasting equipment such as video processing equipment and TV transmitting equipment must be modified or revised. At present, therefore, there is no proposal that can be put into practical use.

SUMMARY OF THE INVENTION

It is, therefore, an object of the present invention to provide an aspect ratio-improved television system compatible with conventional systems, and capable of preventing an increase of video information.

It is another object of the present invention to provide an aspect ratio-improved television system compatible with conventional systems and capable of avoiding an increase in deterioration of a video image.

It is a further object of the present invention to provide an aspect ratio-improved television system compatible with conventional systems and which does not require modification or revision of broadcasting equipment of conventional systems.

According to the present invention, there is provided an aspect ratio-improved television system compatible with conventional systems and comprising means for producing a wide-screen television signal as a source signal, the source signal having the same horizontal and vertical synchronizing frequencies as those of conventional television systems, having a smaller number of effective scanning lines than that of conventional television systems, and having a wider horizontal video frequency band than that of existing television systems; means for expanding the time-base of the source signal such that the horizontal video frequency band becomes the same as that of conventional television systems; and means for arranging video information of the time-base expanded source signal in top and bottom portions that are formed due to difference in the vertical effective scanning lines between conventional television systems and a wide-screen television system, the video information being of both side areas of the wide screen that overflow toward the right and left sides beyond the horizontal effective scanning interval of conventional television systems.

BRIEF DESCRIPTION OF THE DRAWINGS

FIG. 9 shows a block diagram of an embodiment of a receiving part according to the present invention;

DETAILED DESCRIPTION OF THE PREFERRED EMBODIMENTS

First, one example of a prior art aspect ratio-improved television system compatible with conventional systems will be described to facilitate the understanding of the present invention.

PRIOR ART

Figure 1:
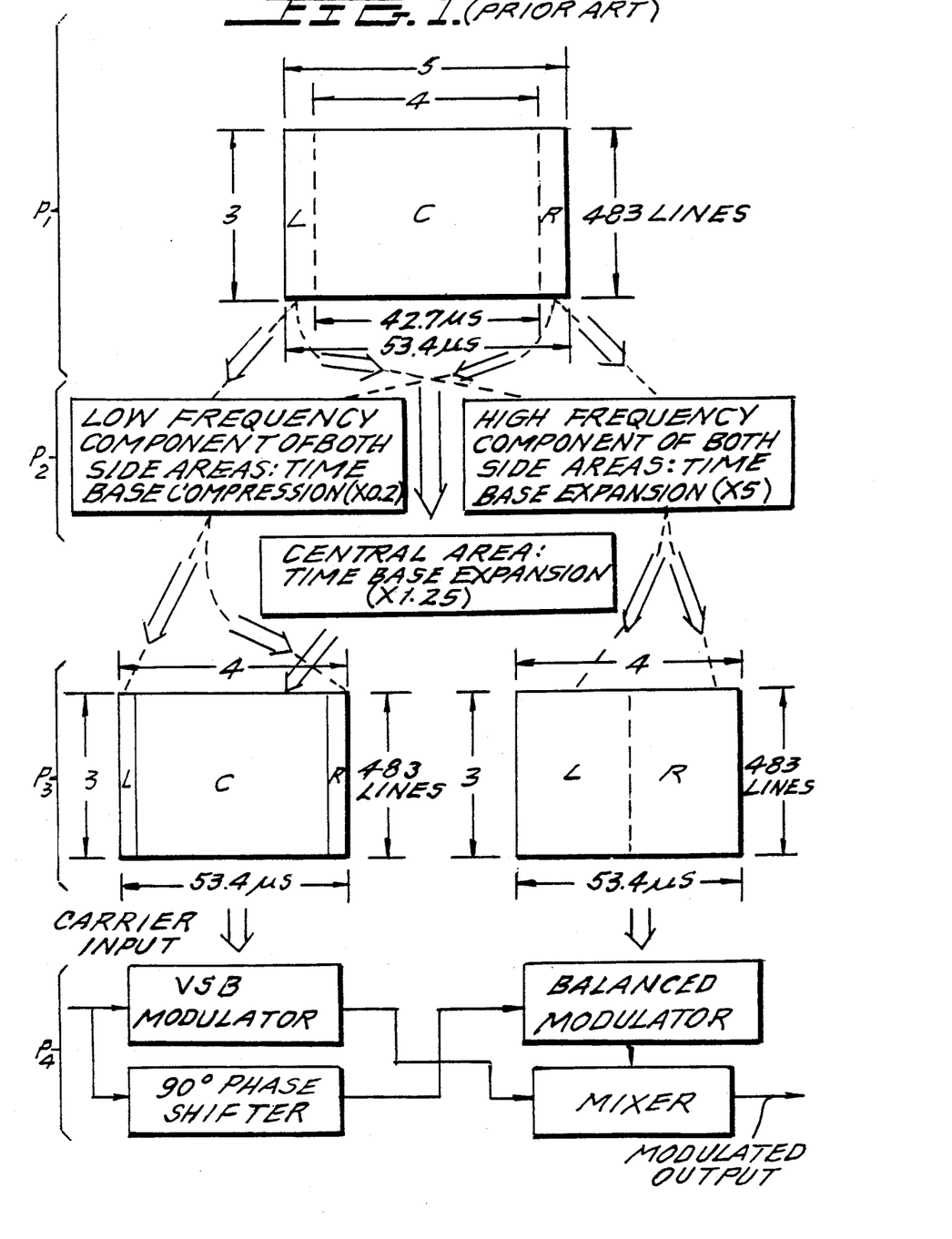
FIG. 1 shows a principle of a prior art aspect ratio-improved television system.

FIG. 1 explains a prior art aspect ratio improved television system (wide aspect system) having an aspect ratio of 3:5, which is compatible with conventional systems having an aspect ratio of 3:4. In FIG. 1, the uppermost portion $P_1$ shows an image scanning area of the wide aspect system, which contains the central area C having the aspect ratio of 3:4 corresponding to the conventional system and side areas L and R. The second upper portion $P_2$ of FIG. 1 shows processes with respect to the respective areas C, L and R. As shown, the central area C is expanded on time base by 1.25 times in the horizontal direction to form a main signal. On the other hand, video information of both the side areas L and R are divided into two; i.e., a low-frequency component and a high-frequency component. The side areas of the low-frequency component are compressed on the time base such that the time base becomes 0.2 times, and are multiplexed at both side ends of the main signal by amplitude-modulating video carrier waves together with the main signal. The side areas of the high-frequency component, on the other hand, are expanded on the time base by 5 times and are transmitted by orthogonal-modulating the video carrier waves. Such processes are shown in portions $P_3$ and $P_4$ of FIG. 1.

The main modulation of the carrier waves based on the main signal is a vestigial side-band modulation that is well known in the conventional system. The modulation based on the high-frequency component of both side areas expanded on time base is a so-called balanced modulation that does not transmit carrier waves. Further, the carrier waves applied to the two modulators are modulated while maintaining a phase difference of 90 degrees and are then mixed. Therefore, in a reception side, if received signals are demodulated in synchronism, the two orthogonally-modulated components can obviously be separated from each other.

Most conventional television receivers employ a envelope-detection method to demodulate the main signal. Therefore, a problem remains with conventional television receivers. That is, when the conventional television receiver employs the envelope-detection method, the signals at both side areas L and R, that are orthogonally modulated, are undesirably mixed in the main signal. The reasons will become obvious from the description in conjunction with FIG. 2.

Figure 2:
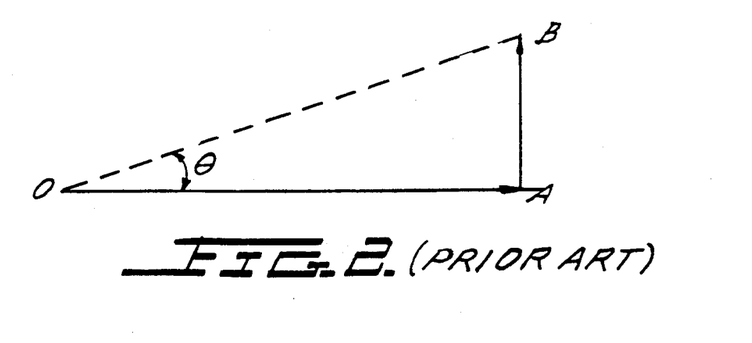
FIG. 2 shows a vector diagram of orthogonal modulation.

FIG. 2 is a vector diagram of the orthogonal modulation wherein the vector $\overline{OA}$ is a main vector modulated with the vestigial side-band, and the vector $\overline{AB}$ is a sub-vector orthogonally modulated. Therefore, the angle formed by the vector $\overline{OA}$ and the vector $\overline{AB}$ is 90 degrees. The purpose of envelope detection is to detect the absolute value of a resultant vector $\overline{OB}$ composed of the vector $\overline{OA}$ and the vector $\overline{AB}$. Therefore, the mixing amount is given by:

$$\text{Mixing amount} = \frac{\sqrt{OA^2 + AB^2} - OA}{OA} \times 100\%$$

Accordingly, if a circuit is so designed that the S/N ratio is the same for the vector $\overline{OA}$ and the vector $\overline{AB}$, then there takes place the mixing which is as great as about 40%. If the amplitude of the vector $\overline{AB}$ is so decreased that the mixing amount does not pose any problem in practice, the S/N ratio at both the side areas L and R becomes smaller than that of the central area C. Thus, different S/N ratios at the central area C and at both the side areas L and R appear on the same screen. Therefore, though this proposal operates as desired for wide aspect television systems, a serious problem remains with conventional television receivers.

Further, the following problems still exist according to the prior art.

(1) Non-coincidence of transmission distortion.

Since the transmission method is different between the central area C and the side areas L and R, the transmission distortion accordingly differs and, thus, the picture quality differs between the central area C and the side areas L and R. When the picture quality changes with respect to areas on the same screen, viewers find the change very uncomfortable to observe visually and psychologically as is well known compared with when the whole screen is uniformly distorted.

(2) Necessity for newly providing a transmission channel for sub-signals in addition to the main signal.

A so-called ST link, which transmits a broadcast program from a studio in a broadcast station to a transmission place, can transmit the main signal but cannot transmit the high-frequency components of the side areas. Therefore, the a microwave-transmission channel must be newly allotted, and an appropriate facility must be added.

(3) The sub-signals cannot be recorded by a conventional home VTR.

The conventional home Video Tape Recorder (VTR) may be capable of recording the main signal but is incapable of recording the sub-signals corresponding to the side areas.

(4) A closed-circuit TV lacks a transmission channel for transmitting the sub-signal.

PRESENT INVENTION

Figure 3:
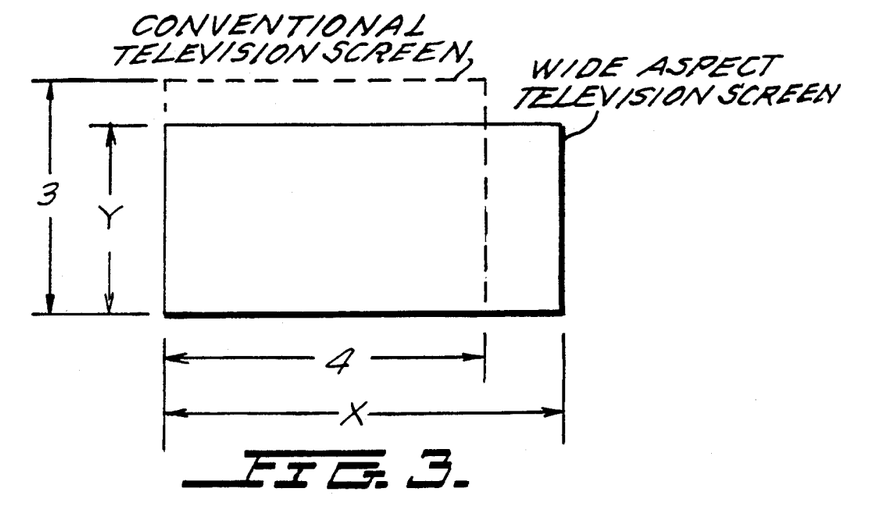
FIG. 3 shows a principle of a wide aspect television system according to the present invention.

The present invention will now be described in detail in conjunction with the drawings. FIG. 3 shows a fundamental principle of the present invention, wherein a rectangle of a dotted line indicates a TV screen of a conventional system having the aspect ratio of 3:4. A rectangle of a solid line indicates a wide screen of a wide aspect television system according to the present invention. The height y and width x of the wide screen are so selected that the area of the wide screen becomes equal to the area of the screen of the conventional system. When the area of the wide screen is equal to the area of the screen of the conventional system, the respective amounts of video information are equal and the respective transmission capacities match completely as between the wide aspect television system of the present invention and the conventional system.

This will be described in further detail. The area of a right portion represented by the difference between "4" and "x" in FIG. 3 represents video information that must be newly transmitted as a result of widening, and the area of a top portion shown by the difference between "3" and "y" in FIG. 3 is an area that was originally filled with video information to be transmitted but does not exist in the present system. Therefore, y and x should be so selected that the amount of video information that must be transmitted becomes equal to or smaller than the amount of video information that can be transmitted. Further, with regard to an wide aspect television signal, the area that overflow outside the screen of the conventional system should be transmitted by rearranging it over and under a screen in time and space.

Here, on the assumption that the aspect ratio according to the present invention is 9:16, there holds the following equation.

$$x/y = 16/9 \tag{1}$$

$$y \cdot (x-4) \leq 4 \cdot (3-y) \tag{2}$$

From the equation (2), $12 \geq x \cdot y$ \hfill (3)

If $x = 4 \cdot F$, \hfill (4)

From the equations (1) and (4), $y = 9 \cdot F/4$ \hfill (5)

From the equations (3), (4) and (5), $$F = \frac{2}{\sqrt{3}} \tag{6}$$

Therefore, $$y = \frac{3 \cdot \sqrt{3}}{2}, x = \frac{8}{\sqrt{3}} \tag{7}$$

Figure 4:
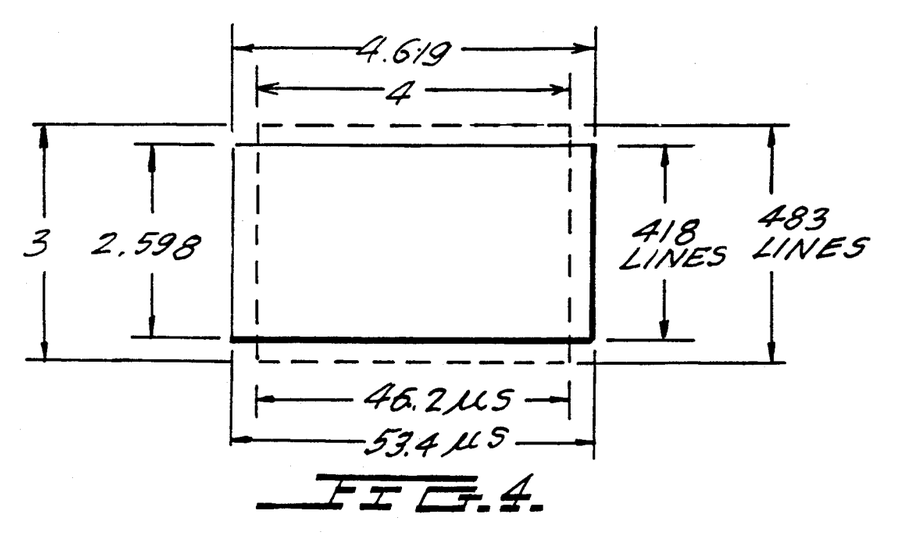
FIG. 4 also shows a principle of the wide aspect television system of the present invention, and is a modification of FIG. 3.

FIG. 4 is a diagram which is so drawn that the center of the screen of the conventional system comes in agreement with the center of the screen of the wide aspect system. In practice, a television camera effects scanning with 418 effective scanning lines for the portion of the solid line rectangle of FIG. 4. In order to maintain compatibility, the reference synchronism of the camera is set to be the same as that of the conventional system, and an image, for example a circle, must be displayed to be a correct circle on the conventional receiver. For this purpose, the time base is extended by 4.619/4 times such that the width of the horizontal portion of the 3:4 aspect screen, i.e., the period of 46.2 μs becomes equal to a horizontal effective period of 53.4 μs. Furthermore, the side areas are transmitted by rearranging then into the top and button spaces which correspond to differences between 483 lines and 418 lines.

Described below are fundamental problems and countermeasures of the case when both the side areas of the screen are transmitted while being separated away from the central area. When one scanning line is transmitted after being divided into two or more segments, transient phenomenon appears at the divided point due to characteristics of a transmission path. When combined again together, therefore, a transient problem appears arises. In the system of the present invention, therefore, it is important to introduce an "overlap width" in order to cope with such problem.

That is, the signal of the central area is transmitted maintaining an ordinary length in compliance with the conventional system. However, both the side areas are transmitted while being overlapped on the signal of the central area in excess of a length which is about two times as great as the width of transient phenomenon. Then, it is allowed to remove the problem of transient phenomenon in the central area and the portion of transient phenomenon at both the side areas, and to combine the signals together free of distortion such that the recombined signal is free of transient phenomenon. The portion that is transmitted in the overlapped manner is referred to here as "overlap width".

The embodiment which has introduced the "overlap width" will now be described in conjunction with FIG. 5. Assuming that the aspect ratio of the wide aspect system of the present invention is 9:16 and the conventional system is the NTSC system having the aspect ratio of 3:4, the vertical blanking period is 8% of the vertical scan period and the horizontal blanking period is 16% of the horizontal scan period. As shown in the top part $Q_1$ of FIG. 5, the image scanning is effected to have 483 effective scanning lines in the conventional system and to have the effective horizontal period of 84%. Furthermore, if the time base expansion factor F in the horizontal direction is set to be 8/7 to match the central area with the 3:4 screen of the conventional system, there hold the following relationships:

Horizontal length of a wide signal after expansion on
the time base = 84% × 8/7 = 96%  (8)

Length of each side area (one side) after expansion on
the time base = 96 − 84/2 = 6%  (9)

From the equation (5), $y = 9F/4 = 72/28$  (10)

Here, y indicates the height of the wide aspect screen under the height of "3" for the NTSC system. Therefore, when the "overlap width" is applied, the effective scanning lines of the wide aspect television system becomes the following number:

$483 \times y/3 = 414.$  (11)

In the top part $Q_1$ of FIG. 5, the frame of image scanning has 414 lines with a height of 2.571 and a width of 4.57 which is 84% of the horizontal scan period (hereinafter abbreviated as 84% H). In the image output, the horizontal length that corresponds to 3:4 aspect of the central area is 74% H from the equation (4).

Figure 5:
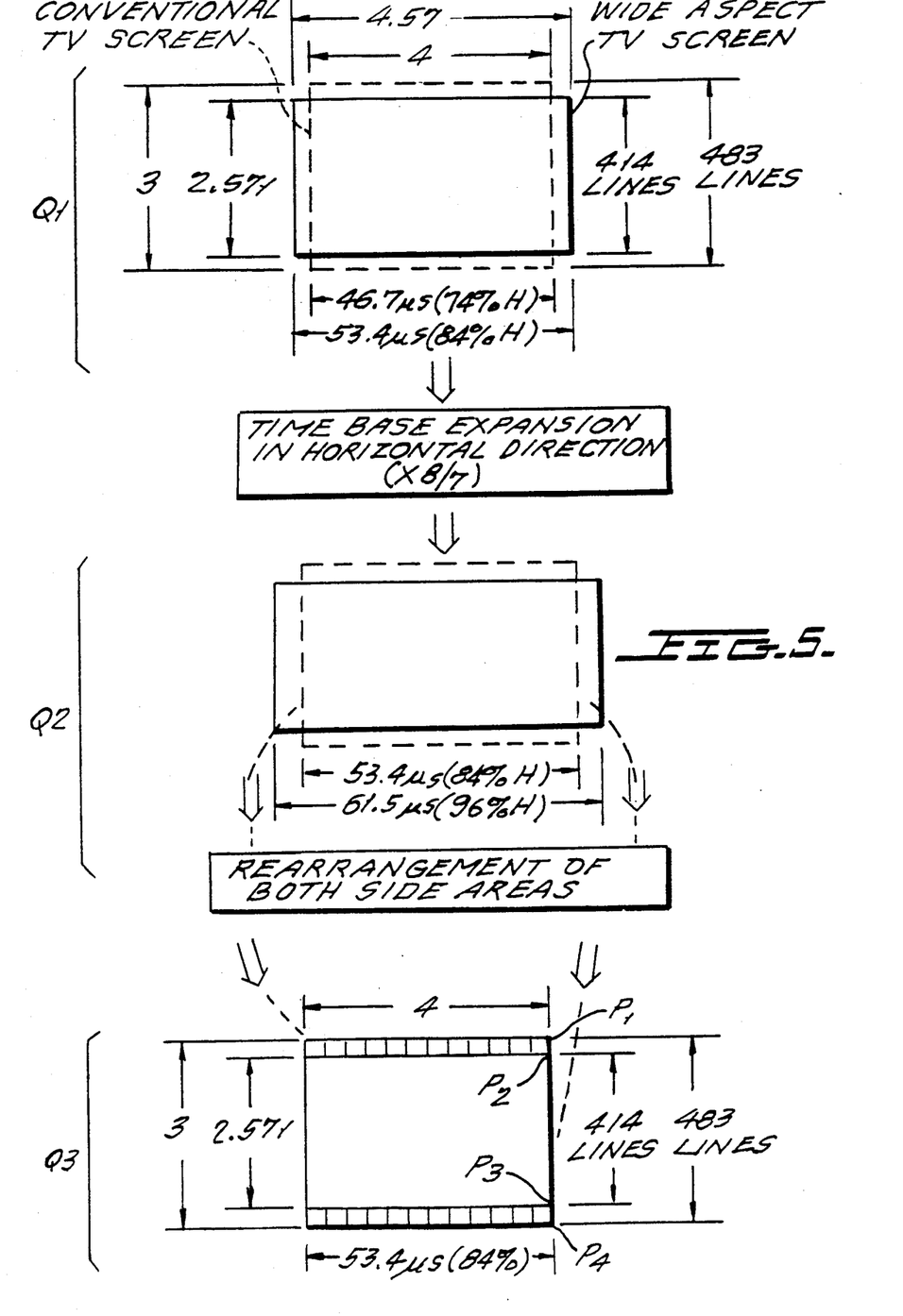
FIG. 5 shows fundamental processes of the present invention.

Next, by time-base expansion in the horizontal direction, the overall width is expanded to 96% H and the central area is expanded to 84% H as shown at the central part $Q_2$ of FIG. 5. As shown in the bottom part $Q_3$ of FIG. 5, furthermore, the 6% portion outside 84% H is rearranged in time and space into the top and bottom ends of the screen. However, the 7% portion inclusive of the aforementioned "overlap width" is allocated to the top and bottom portions of the screen. As a result, therefore, there are obtained a transmission signal having a total of 483 scanning lines and 84% H.

As will be apparent from the foregoing description, 414 lines of the transmission signal corresponding to the central area can be directly received by the conventional receiver. In this case, they have such an aspect ratio that a circle can be displayed correctly on the receiver with an aspect ratio of 3:4. In the wide aspect receiver, the conversion in FIG. 5 is reversed whereby the same signal as those in the image scanning at the top part $Q_1$ of FIG. 5 is reproduced and are displayed on the wide aspect screen.

Figure 6:
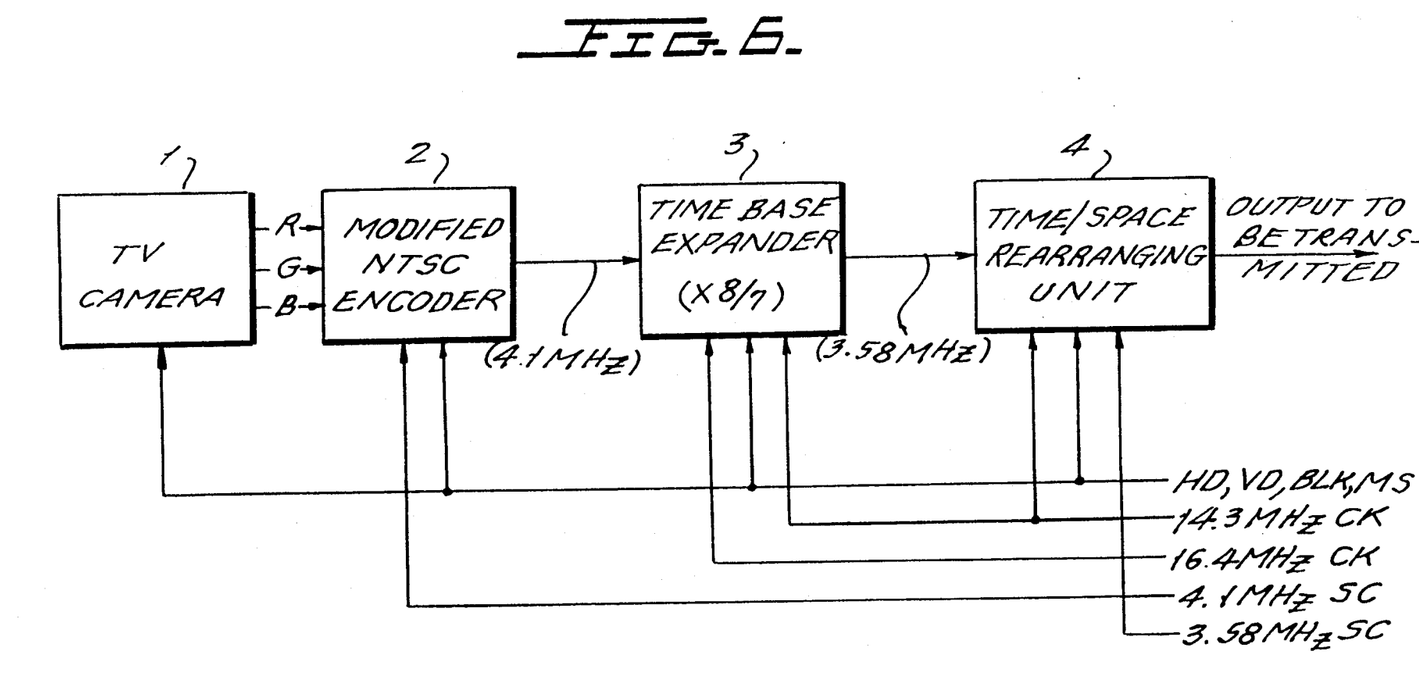
FIG. 6 shows a block diagram of an embodiment of a transmitting part according to the present invention.

An embodiment of the present invention will be now described. The embodiment performs the process shown in FIG. 5. FIG. 6 is a block diagram of an embodiment of the present invention which receives a horizontal drive signal HD, a vertical drive signal VD, a composite blanking signal BLK, a composite synchronizing signal MS, and a color sub-carrier SC of 3.58 MHz. These signals are normally generated by a synchronizing signal generator of the NTSC standard type. As will be described later in detail, furthermore, the embodiment receives 4.1 MHz SC which is 8/7 times as great as the frequency of 3.58 MHz.

A television camera 1 delivers R, G and B component signals and the camera is normally quite the same as a conventional NTSC camera except that it is so adjusted that the aspect ratio of the frame is 9:16, and 414 scanning lines are contained in the vertical direction. The three color components signals from the camera are encoded by a modified NTSC encoder 2 into a modified NTSC signal. The modified NTSC encoder 2 differs from an ordinary NTSC encoder in that the former modulates color signals by using 4.1 MHz SC which has a frequency of 8/7 times ordinary color sub-carrier frequency and that characteristic frequencies of all filters inclusive of I and Q filters are multiplied by 8/7.

The modified NTSC signal produced by the modified NTSC encoder 2 are supplied to a time base expander 3 and time-base-expanded by 8/7 in the horizontal direction. Therefore, the color sub-carrier frequency becomes the conventional frequency of 3.58 MHz and the I and Q bands become the conventional band after the time-base-expansion. The output of the time base expander 3 is sent to a time/space rearranging unit 4.

Figure 7:
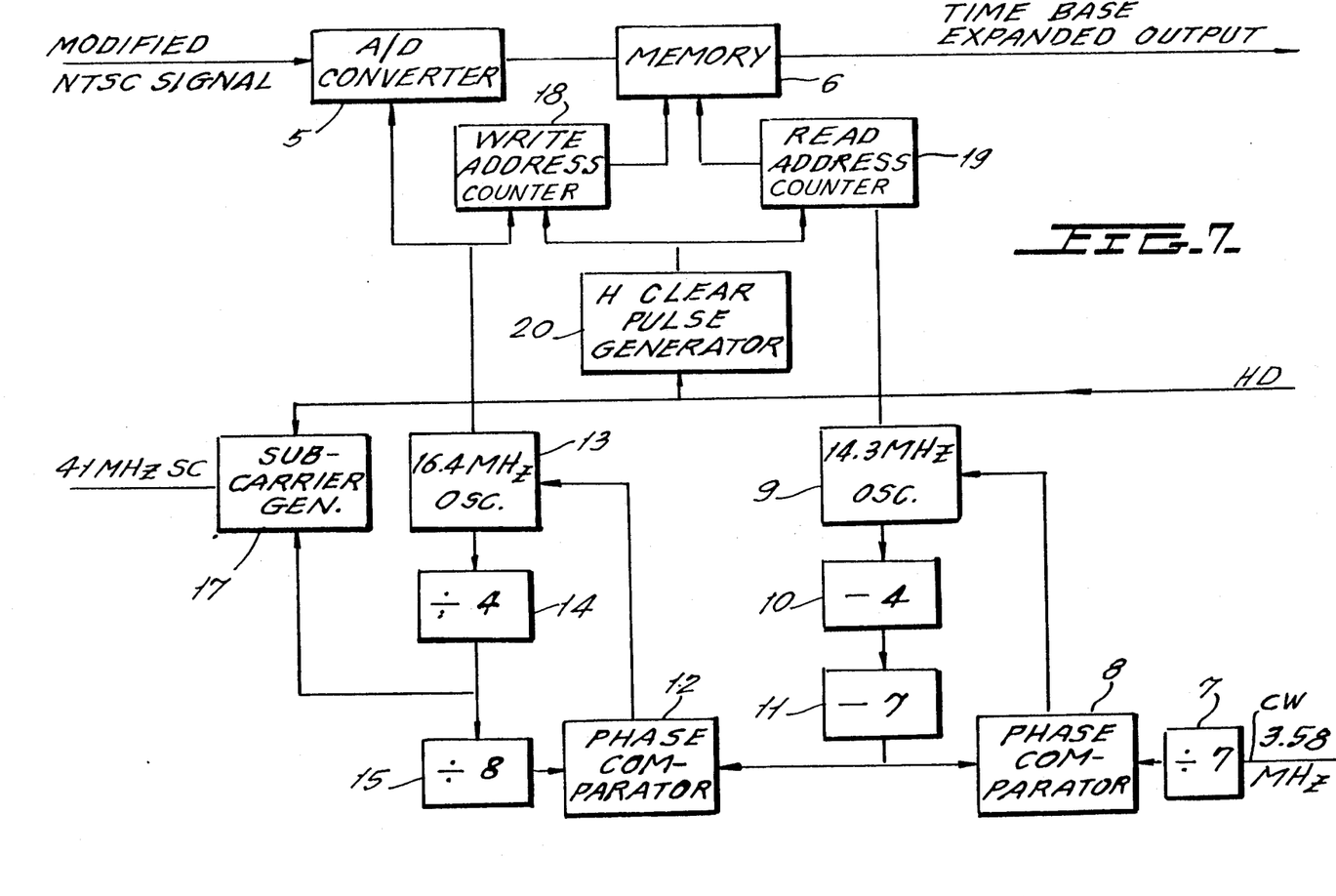
FIG. 7 shows a block diagram of a time base expander shown in FIG. 6.

The time base expander 3 is further explained in detail in connection with FIG. 7. In FIG. 7, the modified NTSC signal from the modified NTSC encoder 2 is sampled by 16.4 MHz clocks from a write clock oscillator 13, subjected to A/D conversion through an A/D converter 5, and are written into a 1H memory 6. The video signal written into the memory 6 is read out by 14.3 MHz clocks which is four times as great as the conventional color sub-carrier frequency, and is sent to a next stage. Here, the time-base expansion depends on the frequency relationship between the 16.4 MHz write clocks and the 14.3 MHz read clocks. In FIG. 7, a signal CW of 3.58 MHz supplied from outside external is divided by seven by a frequency divider 7, and the divided output is supplied to a phase comparator 8. The other comparative input to the phase comparator 8 is obtained by frequency dividing the 14.3 MHz clock from an oscillator 9 by 28 by a series of a frequency divider 10 and a frequency divider 11. Therefore, the frequencies of one-seventh color sub-carrier frequency are compared for their phases, and the output frequency of the oscillator 9 is controlled in accordance with the phase comparison result. Therefore, an APC loop is constituted, and the output frequency of the oscillator 9 is accurately maintained with the four times frequency of 3.58 MHz.

Next, the frequency-divided output obtained from the frequency divider 11 is sent to another phase comparator 12 and phase-compared for its phase with the output obtained by frequency-dividing the 16.4 MHz clock by 32. Thus, a series of a frequency dividers 14 and 15 is provided between the oscillator 13 and the phase comparator 12. The phase comparison result of the phase comparator 12 is supplied to the oscillator 13 for the APC control. The difference between the two APC loops for the 14.3 MHz oscillator 9 and the 16.3 MHz oscillator 13 is that the first loop includes the frequency divider 11 having a dividing factor of seven and the second loop includes the frequency divider 15 having a dividing factor of eight. Accordingly, the 16.4 MHz oscillator 13 produces a frequency that is exactly 8/7 times as great as the frequency produced by the 14.3 MHz oscillator 9. As a result, the data written at high speed (i.e., 16.4 MHz) are then read out at a low speed (14.3 MHz), and therefore the time base is expanded.

Next, the generation of the 4.1 MHz subcarrier will be described. The output of the 16.4 MHz oscillator 13 is frequency-divided by four by the frequency divider 14 and the frequency divided output is supplied to a subcarrier generator 17, which generates subcarrier waves of 4.1 MHz for the modified NTSC encoder 2 (FIG. 6). The HD signal is applied to the subcarrier generator 17 so as to invert the polarity of the subcarrier for every 1H at the horizontal blanking period. That is, the NTSC color subcarrier frequency is 455/2 times as great as the horizontal scan frequency. Even the 4.1 MHz subcarrier of FIG. 7 must have an odd number of times divided by two. Eight-seventh times 455/2 is 455/2×8/7=260 which is an integer. Therefore, the SC-GEN 17 switches the polarity every 1H. This is because both the clocks of the input side and the clocks of the output side of the time base expander have a frequency that is an integer multiple of the horizontal repetition frequency, and the video signals are adjusted in advance such that the time base expander may be allowed to work in the same phase on every horizontal scanning.

Further, FIG. 7 includes a write address circuit 18 a read address circuit 19, and a horizontal clear circuit 20.

Figure 8:
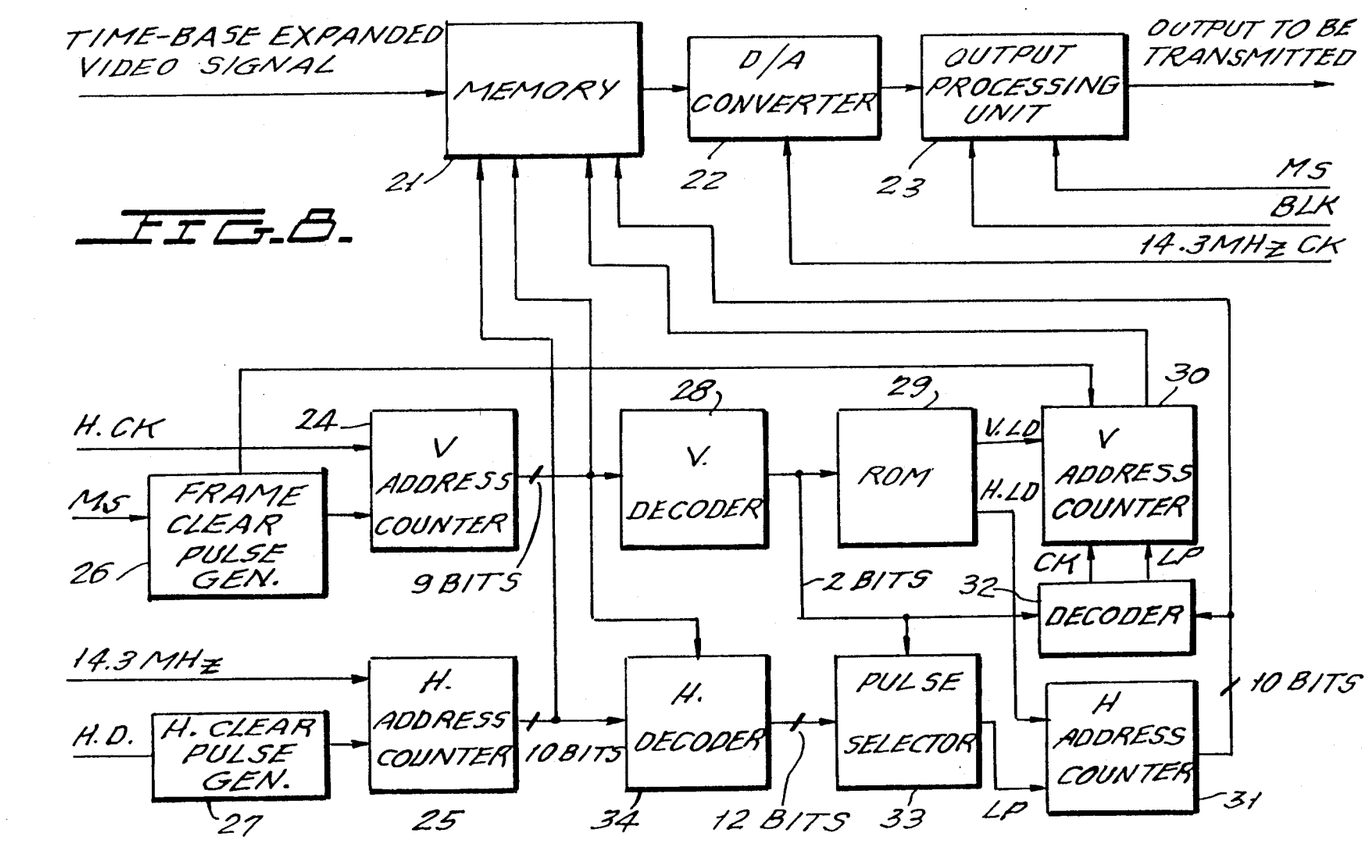
FIG. 8 shows a block diagram of a time/space rearranging unit shown in FIG. 7.

The time/space rearrangement according to the present invention will now be described in detail in conjunction with FIG. 8. The time base expanded video signal produced by the time base expander 3 (FIG. 7) is supplied to a frame memory 21. The time/space rearrangement is performed while reading out the time base-expanded video signal from the frame memory 21. The time/space rearranged video signal is read out from the frame memory 21 and converted into an analog signal by a D/A converter 22. Further, the analog signal from the D/A converter 22 is processed by an output processor 23 where a blanking signal and a synchronizing signal are added to the analog signal from the D/A converter 22.

The writing address for the frame memory 21 is produced by a V address counter 24 and an H address counter 25. Here, the V address counter 24 is driven by a narrow clock pulse HCK of the horizontal drive pulse HD, and is cleared by a clear pulse in every frame period. The clear pulse is produced by a frame clear pulse generator 26 which receives the composite synchronizing signal MS. Therefore, the output of the V address counter 24 is used as an address in the vertical direction and is capable of distinguishing the odd field and the even field. The H address counter 25 produces the address in the horizontal direction. The H address counter 25 is driven by 14.3 MHz clocks and is cleared by a horizontal clear pulse in every H period. The horizontal clear pulse is produced by a horizontal clear pulse generator 27 which receives the horizontal drive pulse HD. Therefore, the writing address comprised of the V address and the H address is generated in a manner that the time base-expanded video signal is properly written onto the X-Y coordinate plane as if a picture is being drawn.

The memory 21 includes at least two field memory areas in which video data are read out from one field memory area while being written into the other field memory area. In this embodiment, the time/space rearrangement shown in FIG. 5 is performed when the video data are read out from the memory 21. The rearrangement operation will be described below.

The output of the V address counter 24 is supplied to a decoder 28 which consists of a decoding part and a flip-flop unit. The decoder 28 delivers two-bit data in accordance with the vertical direction sequence. The two-bit data has a value "00" from the top position of the NTSC screen to the top position of the wide aspect video signal (from the point $p_1$ to the point $p_2$ in FIG. 5), has a value "01" during the period of 207 lines on the wide aspect signal (from the point $p_2$ to the point $p_3$ in FIG. 5), and has a value "10" from the bottom position of the wide aspect screen to the bottom position of the NTSC screen (from the point $p_3$ to the point $p_4$ in FIG. 5). The two-bit data from the decoder 28 are supplied to a read-only memory 29 to select load data that are to be loaded onto a vertical address counter 30 and onto a horizontal address counter 31. The two-bit data are further supplied to a decoder 32 to produce timings necessary to the V address counter 32. Accordingly, the decoder 32 delivers a clock for switching the vertical address and a load pulse for loading the load data.

These circuits operate now as described. A horizontal decoder 34 receives the horizontal writing address from the address counter 25 and delivers pulses obtained by equally dividing the effective horizontal period (active video portion, 84% horizontal scanning period) of the NTSC system by twelve. First, when the output of the decoder 28 is "00", the pulses from the decoder 34 are all supplied as the load pulses to the H address counter 31 through a selector 33. Therefore, the H address counter 31 repeatedly generates horizontal addresses for reading the video data of the left side area of the wide aspect screen.

If the length of the 1H period corresponds to 192 cycles in terms of the number of color sub-carriers, the length of the one-twelfth portion is a period of 16 (192/12) cycles. This numeral is selected with practically no limitation under the condition that the phase of sub-carriers onto read-out video data should be continuous. At the same time, the output of the H address counter 31 is decoded by the decoder 32 which then produces the clock pulse to the V address counter 30 in response to the end of each of the horizontal one-twelfth portions, such that the vertical address is incremented. Therefore, when the output the decoder 28 is "00", the video data of the left side area of the time base-expanded screen are continuously read out to make one line by side area video elements of 12 lines, and the video data of the left side area on 207 lines are read out during a period of 17.25 H.

Then, the output of the decoder 28 becomes "01". Under this condition, first, the selector 33 selects the first pulse out of the 12-dividing pulses as the load pulse, i.e., selects the pulse having a phase at the left edge of the NTSC screen. From the ROM 29, an address at the left edge of the central portion of the time base-expanded screen is supplied as the horizontal load address, and is loaded onto the H address counter 31. Thereafter, the H address counter 31 continues the counting operation with 14.3 MHz clocks. The decoder 32 detects the right edge of the central portion: a clock is produced when the horizontal address proceeds up to this position, and the vertical address is incremented by one. This sequence is repeated 207 times, and the output of the decoder 28 changes into "10". Under this condition, the operation returns to nearly the same as when the output is "00", the difference only being that the horizontal load data given to the H address counter 31 from the ROM 29, i.e., in this case the horizontal load data, correspond to an address at the right edge of central area in the screen. Therefore, video data of the right side area are read out. Accordingly, the transmitted video data of the bottom portion in $Q_3$ of FIG. 6 are produced.

The embodiment will now be described in further detail. The time base-expanded video signal has a sub-carrier whose polarity should be changed for every 1H. To this end the decoder 34 receives the least significant bit (LSB) of the output of the V address counter 24, whose polarity changes for every 1H. Therefore, the phase of the pulses detected by the decoder 34 is deviated by a phase amount corresponding to two clocks, i.e., deviated by a half cycle of the color sub-carrier, such that the phase of the color sub-carrier is kept continuous after the video data of both side-areas of the screen have been sequentially read out under the conditions of "00" and "10" in the output of the decoder 28. Further, it need not be pointed out that the horizontal load data supplied from the ROM 29 to the H address counter 31 includes the "overlap width" at both the right and left side areas of the screen.

On a reception side, a process reverse to the process of FIG. 6 is carried out, i.e., a reversal of the time/space rearrangement to compression of the time base, and decoding of the modified NTSC signal.

Figure 9:
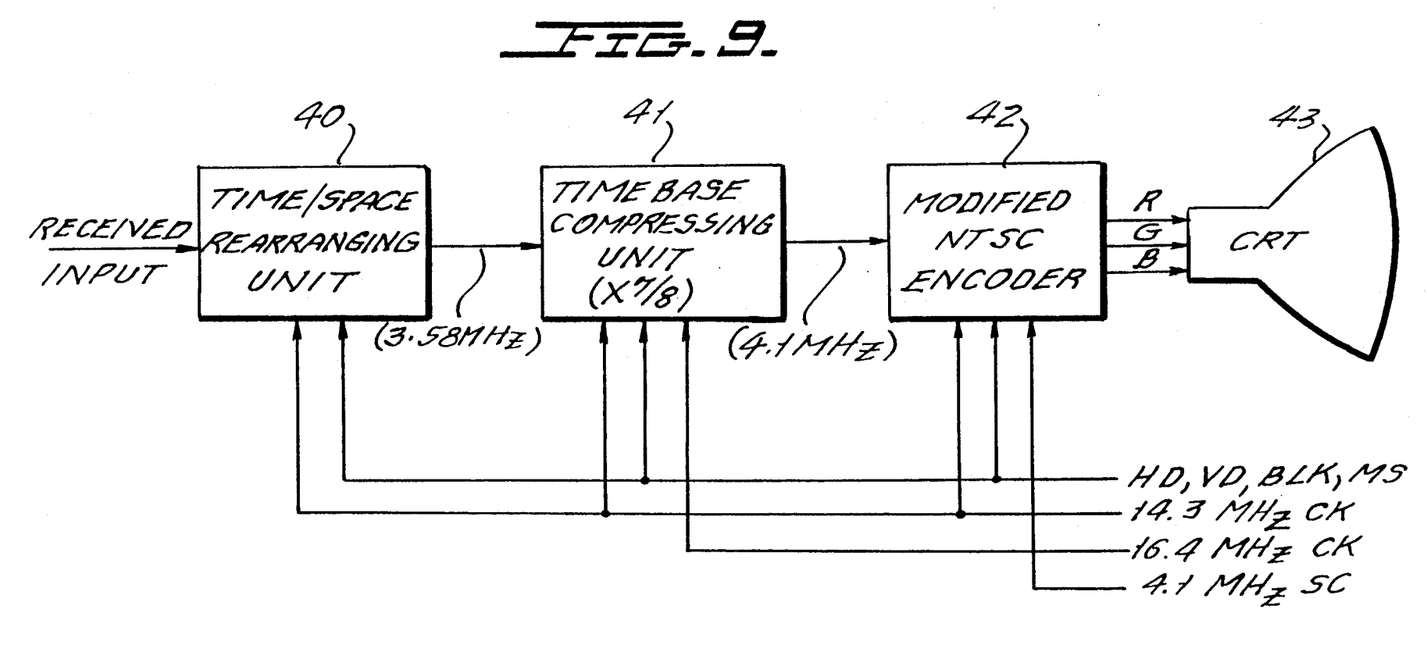
FIG. 9 is a block diagram of a wide aspect receiver of an embodiment of the present invention.

FIG. 9 is a diagram of a wide aspect receiver according to an embodiment of the present invention. A received input signal rearranged on the transmitting apparatus is supplied to a time/space rearranging unit 40 and converted into to a time base-expanded wide-aspect television signal. This signal is then time-compressed by a time base-compressing unit 41 by 7/8 times in the horizontal direction. As a result, the time-compressed television signal includes color sub-carriers of 4.1 MHz, which is 8/7 times as great as that of the ordinary color sub-carriers. The time-compressed television signal is demodulated into R, G and B color signals by a modified NTSC decoding unit 42. Accordingly, a wide-aspect television picture is displayed on a CRT 43.

The time/space rearranging unit 40 is explained in detail in connection with FIG. 10. The received input video signal is digitized by an A/D converter 50 and written into a memory 51. By a reading operation of the memory 51, the time/space rearranged signal is obtained, and, is processed by an output processing circuit 52, and then sent to the time base-compressing unit 41 (FIG. 9) in the next stage.

The video data are written into the memory 51 under the control of writing addresses produced by a V address counter 54 and an H address counter 58. In this case, the video data are written onto the X-Y coordinate plane in the order of scanning. Functions of a frame clear pulse generator 53 and a horizontal clear pulse generator 57 are the same as the blocks 26 and 27 mentioned in connection with the rearranging unit on the transmitting side in FIG. 8. The memory 51 also consists of a frame memory including at least two field memory areas, and the data are read out from one field memory area while being written into the other field memory area.

Figure 11A:
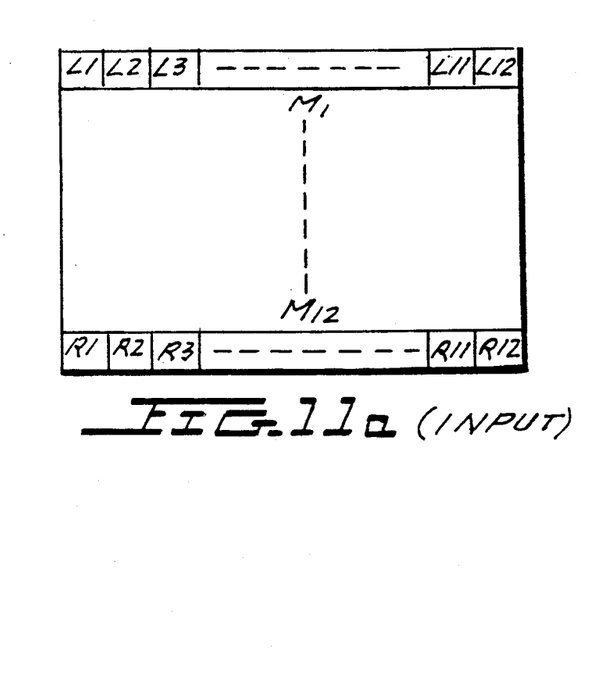
FIGS. 11(a) and 11(b) are diagrams showing operation of the time/space rearranging unit in FIG. 10.
Figure 11B:
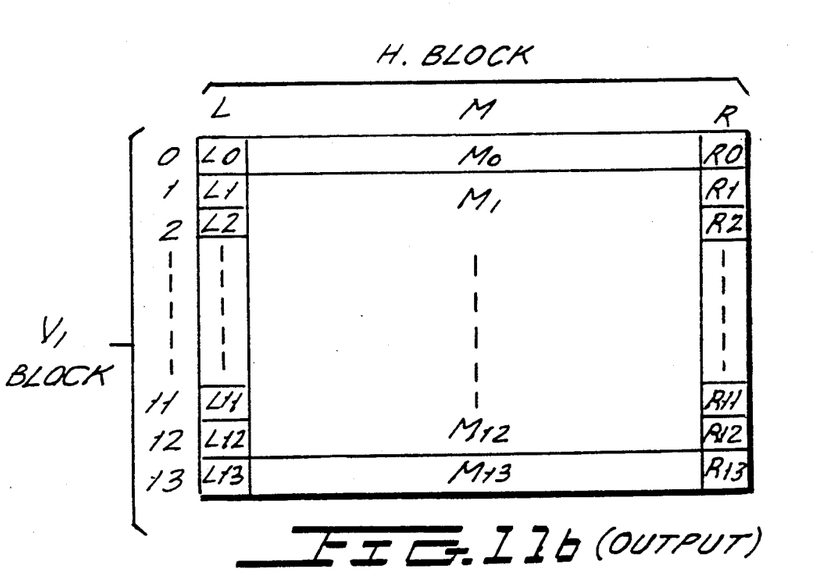

The video data are read out from the memory 51 while effecting the time/space rearrangement in the reversed manner as now in connection with FIGS. 11(a) and 11(b). FIG. 11(a) shows the written state of the received video data which are compatible with that of the conventional system. FIG. 11(b) shows arrangement of the output video data read out from the memory 51. As shown in FIG. 11(b),the read-out video data are returned back to a wide aspect television signal. In FIGS. 11(a) and 11(b), the symbols correspond in a 1:1 manner. The portions L0, M0, R0, L13, M13 and R13 in FIG. 11(b) do not exist in FIG. 11(a), and are treated as invisible portions like the blanking. These portions correspond to a lower number of scanning lines in the wide aspect system in comparison with the conventional system.

Figure 10:
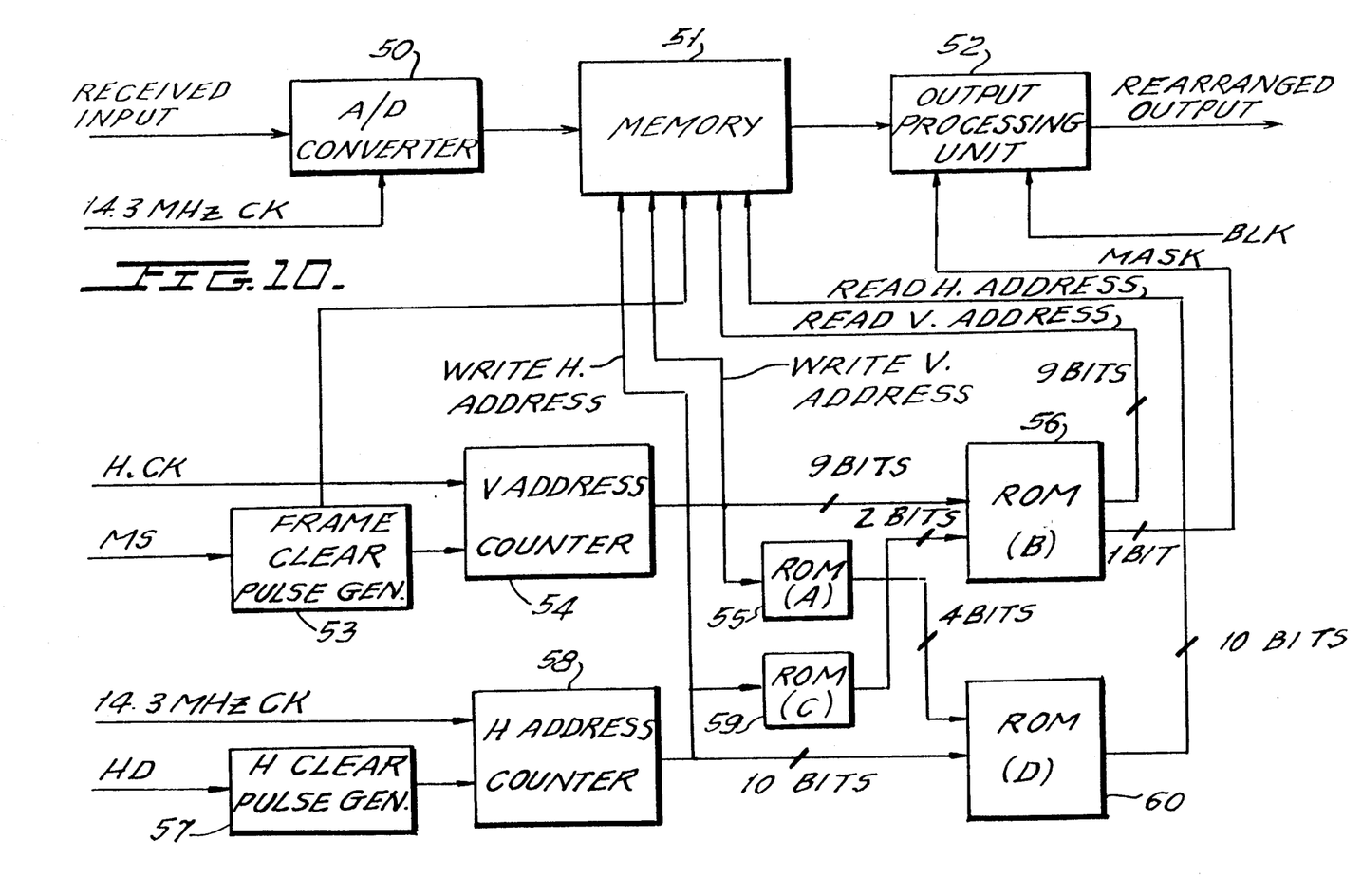
FIG. 10 shows a block diagram of a time/space rearranging unit shown in FIG. 9.

In FIG. 10, the output address of the V address counter 54 is supplied to read-only memories 55 and 56, and the output address of the H address counter 58 is supplied to read-only memories 59 and 60. Furthermore, the output of the read-only memory 55 is supplied to the read-only memory 60, and the output of the read-only memory 59 is supplied to the read-only memory 56. The four-bit data produced from the ROM 55 discriminates the vertical blocks "0" to "13" in FIG. 11(b), and the two-bit data from the ROM 59 discriminates the horizontal blocks L, M and R in FIG. 11(b). The addressed produced from the V address counter 54 and the H address counter 58 start at the left top corner on the screen, and scans the screen from the left to the right, and from top to bottom.

The ROM 55, ROM 56, ROM 59 and ROM 60 work as now described. That is, when the address is produced to scan both side areas of the screen of FIG. 11(b), the address is converted into an address for scanning the top and bottom portions of the screen of FIG. 11(a). For example, when the input address indicates a block L1 in FIG. 11(b), the reading address indicates the block L1 in FIG. 11(a). Further, during the addresses corresponding to the portions L0, M0, R0, L13, M13 and R13 in FIG. 11(b), ROM 56 produces the mask signal. This MASK signal is supplied to the output processor 52 to use for effecting the blanking process. Furthermore, the reading must be skipped over at the overlapped width portions between the central area and both the side areas of the screen, and converted data of the address inclusive of the processing of the overlap width portion are stored into these read-only memories.

Figure 12:
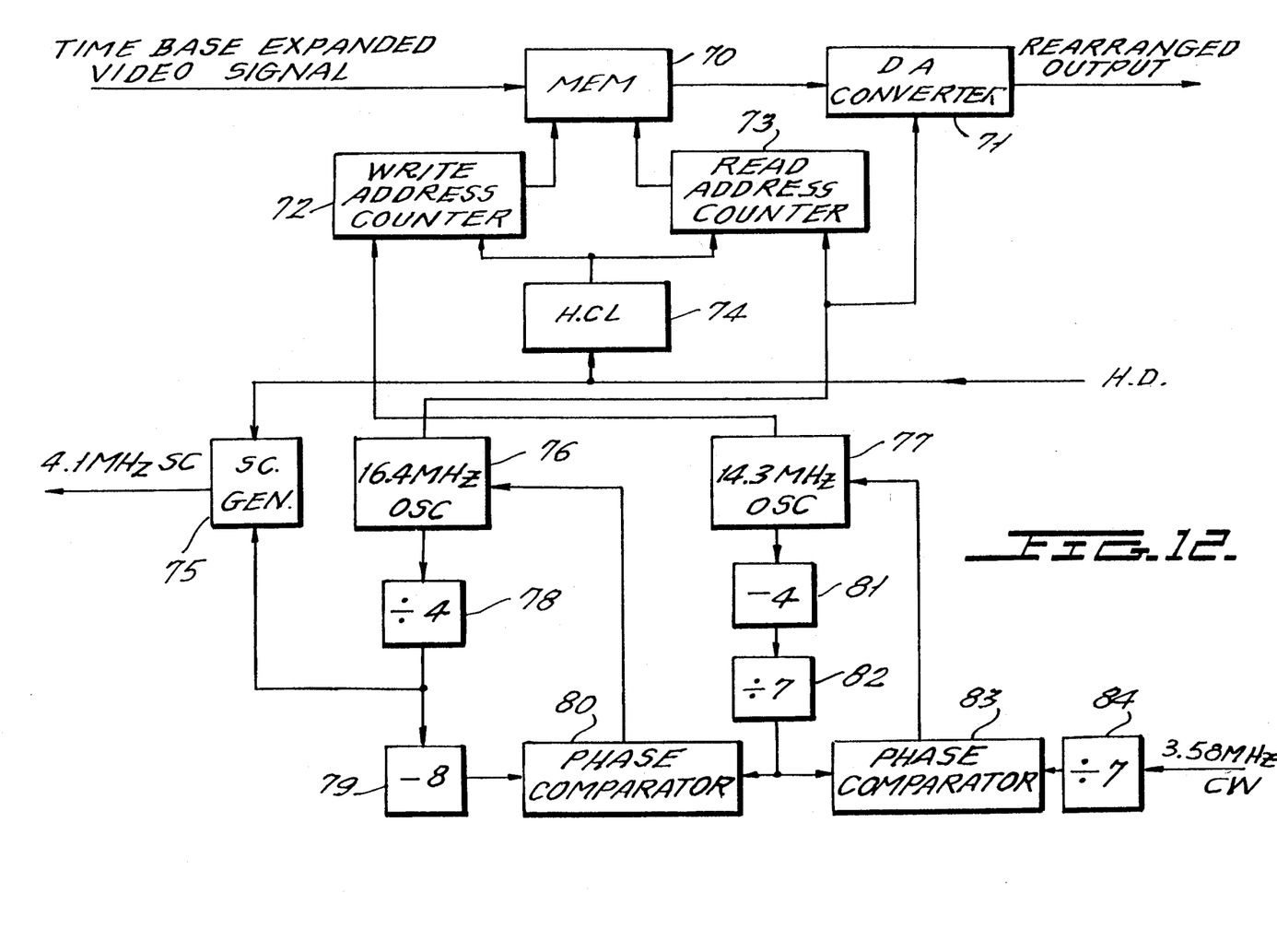
FIG. 12 shows a block diagram of time-base compressing unit shown in FIG. 9.

Next, the time base-compressing unit 41 is explained in connection with FIG. 12. The time base expanded video signal is written into a 1H memory 70 by 14.3 MHz clocks. Then, the video signal written into the memory is read out by 16.4 MHz clocks which is 8/7 times as great as the above frequency of 14.3 MHz and, thus, the time base compression is performed. The 14.3 MHz clocks and the 16.4 MHz clocks are generated by frequency-dividers and phase-comparators based on the 3.58 MHz signal, and the operation is the same as that of the time base expander 3 on the transmitting side (FIG. 7) and is not described here in detail.

According to the present invention, the conventional NTSC receives the transmitted output and displays it without the decoding process. Therefore, the central 3:4 aspect portion only is displayed without any difference from the reception of the conventional system. Strictly speaking, the conventional system has 483 effective scanning lines whereas the wide aspect system of the present invention has 414 effective scanning lines, which is:

$$414/483 \times 100 = 85.7\%$$

If a general television receiver has 5% overscan, the image is substantially lost by 5% on each of the top portion and the bottom portion. It is, however, possible to compensate for this problem.

As described above, a principle of the present invention resides in the area (information amount) of the screen of the wide aspect TV system being brought basically equal to the area of the screen of the conventional TV system. This enables the realization of a wide aspect TV system that can be transmitted through a transmission channel provided for a conventional TV system. Therefore, the present invention is in no way limited to the scope of the embodiment described above.

For example, the side area signals transmitted while being rearranged in time and space into the top and bottom lines can be transmitted while further being frequency-band-compressed. In this case, the band-compressed signals are data necessary to widen the aspect ratio. In this case, the number of effective scanning lines in the wide aspect TV system becomes greater than that of the aforementioned embodiment. However, this case is also an application of the present invention.

In addition to the case described above, the present invention can be modified as described below.

A part of the signal transmitted in the top and bottom lines of the screen is transmitted by using a part of the vertical blanking period in order to increase the number of the effective scanning lines.

According to the present invention, there are the following effects and functions:

(1) A wide aspect TV system can be easily realized while keeping the amount of data that matches the transmission capacity of the conventional TV system.

(2) The present invention can be directly performed without modifying the conventional broadcast equipment such as a transmitter and a receiver, and conventional transmission. Moreover, since the transmission frequency band stays the same, there is no trouble of arranging or allocating frequencies of broadcast waves or in regard to relay transmission radio waves such as ST links.

(3) There is no crosstalk among the signal components.

In most of the prior art wide-aspect systems proposed thus far, the additional information amount is forcibly transmitted in a multiplexed manner, and crosstalk and intermodulation take place among the signal components. According to the present invention, however, an information amount the same as that of the conventional TV system is handled basically in the same signal form. Therefore, the crosstalk and intermodulation are not increased in comparison with a conventional TV system.

(4) In the wide aspect TV system of the present invention, the transmission manner is basically the same for the central area and the two side areas and, thus, transmission distortion and the S/N are quite the same with respect to these areas. Therefore, the TV picture quality at the central area and at the two side areas remains the same under any conditions.

(5) A transient problem that appears between the central area and the side area can be easily corrected.

(6) The present invention can be adapted directly to home VTRs and closed-circuit TVs.

(7) Furthermore, the present invention contributes greatly to merits of conventional TV industries.

The aforementioned effects and functions are found in none of the prior art proposals announced thus far. Therefore, it can be easily recognized by TV-related engineers that these effects and functions are quite innovative ones.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wide-screen televising method compatible with a conventional television system, comprising:
   producing a wide-screen television signal as a source signal, said source signal (i) having the same horizontal and vertical synchronizing frequencies as those of the conventional television system, (ii) having a smaller number of effective scanning lines than that of the conventional television system, and (iii) having a wider horizontal video frequency band than that of the conventional television system;
   expanding the time base of said source signal such that the horizontal video frequency band becomes the same as that of the conventional television system; and
   arranging video information of the time-base expanded source signal in top and bottom portions that are formed due to a difference in the vertical effective scanning lines between the conventional television system and the wide-screen televising method, said video information being of both side areas of a wide screen that overflow toward the right and left sides beyond the horizontal effective scanning interval of the conventional television system; and further comprising providing overlap video information at edges between the side areas and a remaining central area.

2. A wide-aspect television system as claimed in claim 1, wherein said conventional television system is an NTSC system, said source television signal substantially has 414 effective lines and an aspect ratio of 9:16, and said predetermined ratio in said time base expanding means is 8/7.

3. A wide-aspect television system as claimed in claim 1, wherein said video information of both side areas is transmitted with video information of a remaining central area through a common transmitting process.

4. A wide-aspect television system as claimed in claim 3, wherein said conventional television system is an NTSC system, said source television signal substantially has 414 effective lines and an aspect ratio of 9:16, and said predetermined ratio in said time base expanding means is 8/7.

5. A wide-aspect television system compatible with a conventional television system, comprising:

means for producing a source television signal for a wide-aspect television screen, said source television signal having the same horizontal and vertical synchronizing frequencies, but fewer effective scanning lines, than the conventional system;

means for expanding the time base of said source television signal in the horizontal direction by a predetermined ratio; and means for receiving a time-base-expanded television signal produced by said expanding means and for arranging video information of both side areas of the time-base-expanded television signal into top and bottom added scanning lines, a remaining area of the time base-expanded television signal subtracted by said both side areas having a horizontal scanning period substantially equal to a horizontal scanning period of the conventional television system; the total effective scanning lines of said source television signal and said top and bottom added scanning lines substantially corresponding to the total effective scanning lines of the conventional television system, wherein said video information of both side areas contains overlap video information at the edges between said side areas and the remaining area.

6. A wide-aspect television system as claimed in claim 5, wherein said conventional television system is an NTSC system, said source television signal substantially has 414 effective lines and an aspect ratio of 9:16, and said predetermined ratio in said time base expanding means is 8/7.

7. A wide-aspect television system as claimed in claim 5, wherein said video information of both side areas is transmitted with video information of the remaining area through a common transmitting process.

8. A wide-aspect television system as claimed in claim 7, wherein said conventional television system is an NTSC system, said source television signal substantially has 414 effective lines and an aspect ratio of 9:16, and said predetermined ratio in said time base expanding means is 8/7.

* * * * *